UNITED STATES PATENT OFFICE.

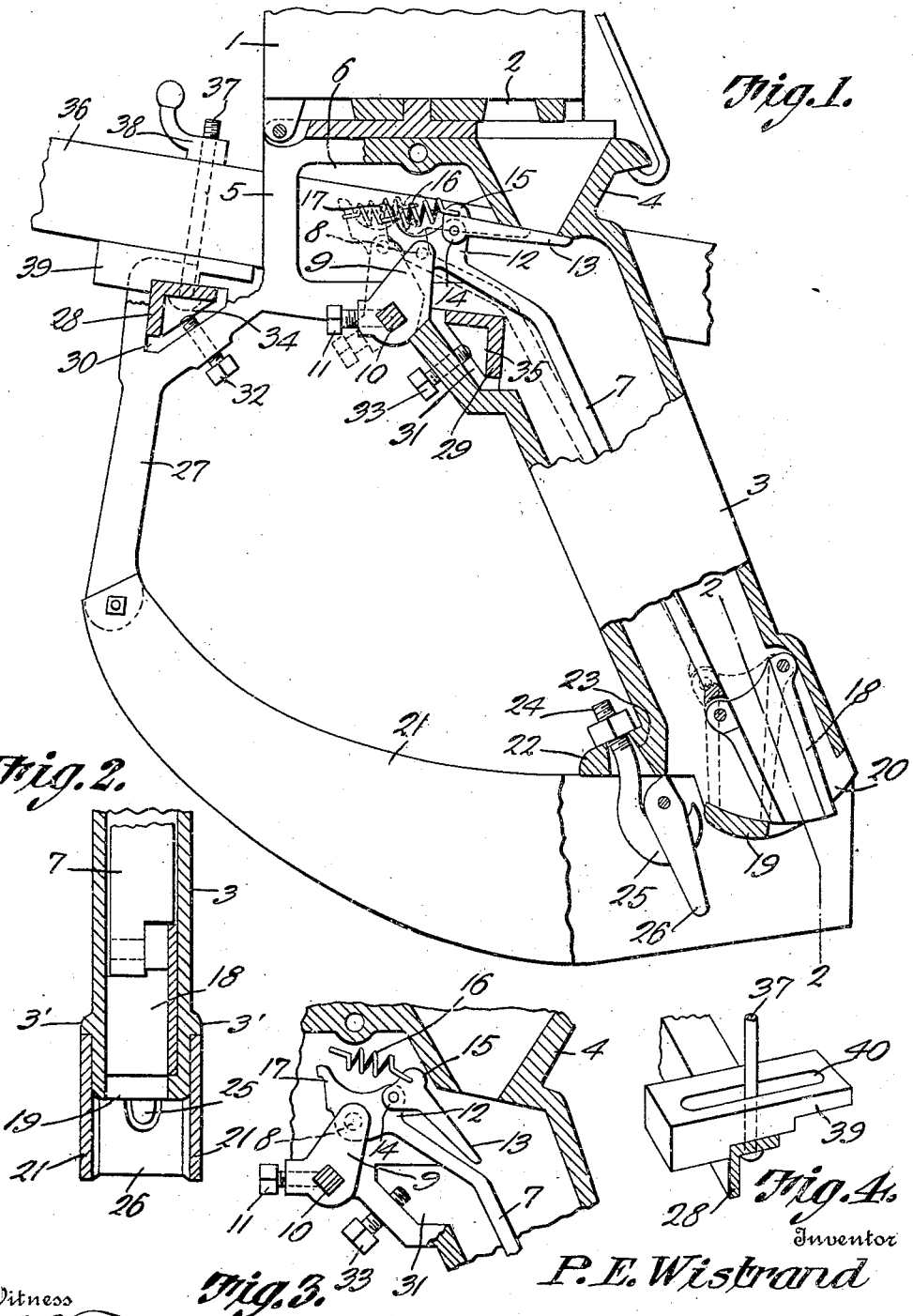

PETER E. WISTRAND, OF GALVA, ILLINOIS.

SEED-PLANTER.

1,246,208. Specification of Letters Patent. Patented Nov. 13, 1917.

Application filed April 16, 1917. Serial No. 162,405.

*To all whom it may concern:*

Be it known that I, PETER E. WISTRAND, a citizen of the United States, residing at Galva, in the county of Henry and State of Illinois, have invented a new and useful Seed-Planter, of which the following is a specification.

The subject of this invention is a seed planter of that class commonly known as "check-row planters," and relates more especially to the shoe and its shank, and the feed mechanism in the latter.

The main object of the invention is to provide a check-row planter which may be readily converted into a drill.

Another object is to provide means for adjusting the distance between the seed depositing members, which means will permit of most minute adjustments.

Another object is to provide a yielding seed delivering valve which will not cut or injure the seed.

Another object is to provide means for connecting the drill shoe to its shank.

Still another object is to provide means for adjusting the height of the draft pole.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings:

Figure 1 is a side elevation, partly in section of the planter shoe and its shank, the valves and connecting link being shown in discharge position in full lines, and in normal position in dotted lines;

Fig. 2 is a detail sectional view taken substantially on the line 2—2 of Fig. 1;

Fig. 3 is a broken detail showing, in vertical section, the upper portion of the shank with the upper valve in its released position;

Fig. 4 is a perspective view of the stepped tongue adjusting block.

Referring to said drawing by numerals:

A seed hopper 1 has a seed discharge port 2 provided in its bottom, and to the bottom of the hopper, and underlying the discharge port 2, is fastened a hollow shank 3, in which is formed a seed conveying tube.

The head of the shank 3 has formed thereon a seed receiving cup 4, substantially in the form of an inverted cone, and having a discharge port in the bottom thereof, and an offset portion 5 forming a chamber 6.

Slidably mounted within the shank 3, and extending longitudinally thereof, is a link 7, the angularly disposed upper end of which extends into the chamber 6, and is pivoted to the pin 8 of a crank 9, which crank is mounted on a rock shaft 10, to which it is secured by a set screw 11. The upper end of the link 7 has an upstanding lug 12 formed thereon.

A valve 13, adapted to be seated on the lower end of the seed receiving cup 4 and operable to close the seed discharge port thereof, has laterally extending ears 14 and 15 formed thereon, and the valve has pivotal connection through the ears 14, with the lug 12. A coiled spring 16 has one end hooked through a suitable opening formed in the ear 15, and its other end looped about a finger 17, which rises from the upper extremity of the link 7.

It will be evident that the tension of spring 16 retains the valve 13 in contact with the bottom of the seed receiving member, while, by withdrawing the looped end from the finger 17, (as seen most clearly in Fig. 3) the valve is allowed to drop, thus allowing a continuous flow of seed, which is necessary when the planter is being used as a drill.

Pivotally mounted within the shank 3, adjacent the lower end thereof, and having pivotal connections with the lower end of the link 7, (see Figs. 1 and 2) is a valve 18, substantially in the form of a channel iron. A cross wall 19 extends across a portion of the lower end of shank 3 and acts as a closure for valve 18 when the valve is in its normal position. The valve 18 is adapted to be swung from its normal position to discharge seed through the opening 20.

The lower end of the shank 3 extends between the walls of a shoe 21, and is supported between the walls through laterally extending ribs 3', formed on the shank and adapted to rest upon the upper edge of the walls of the shoe 21. A forwardly extending offset 22 is formed on the lower end of the shank 3, in which an opening 23 is provided. A bolt hook 24 passes through the opening 23 with its hooked end 25 passing through an opening formed in a cross wall 26 which extends between, and is suitably secured to the side walls of the shoe 21. The forward end of the shoe 21 is bolted or otherwise secured to the lower end of an arm 27 which extends forwardly and downwardly from the lower front portion of the offset 5 of shank 3.

Extending transversely of the planter, and suitably supported by the main frame work thereof, are horizontally disposed angle irons 28 and 29. The forward angle iron 28 passes through a suitable opening 30 formed in the upper portion of the arm 27, and the angle iron 29 passes through a suitable opening 31 formed in the walls of the shank 3. By this means the shoe 21 and its shank 3 are adjustably mounted on the angle irons 28 and 29, to which they are secured when adjusted, by the set screws 32 and 33, between the end of each of which and its angle iron is interposed a block 34 and 35, respectively.

The tongue 36 of the planter is secured to the forward angle iron 28 by means of a bolt 37, to which is adapted a wing nut 38. Interposed between the tongue 36 and the angle iron 28 is a stepped block 39 in which is formed a longitudinal slot 40.

As will be readily understood, this stepped block 39 with its longitudinal slot 40, forms a ready means for adjusting the height of the tongue.

It is thought that the assembling of the device is amply understood from the foregoing description. The following will, therefore, be confined to an explanation of the operation.

As the planter is drawn forward, the shaft 10 is rocked, at regular intervals, by any of the usual and well known means employed for this purpose, causing the crank 9 to make a partial revolution and forcing the link 7 rearwardly and downwardly. This motion of link 7 will push the valve 13 rearwardly and close the port in the bottom of the seed cup 4. This movement of the link also causes the valve 18 to rock on its pivot and assume its rearward position, with its discharge end in alinement with the opening 20, which permits the seed in the tube to be discharged. When the shaft 10 returns to its normal position, the valve 13 again opens the port in the bottom of the seed cup 4, and the valve 18 assumes its normal position, so that seed again flows from the cup 4 to the seed tube in the shank 3, in which it is held by the cross wall 19.

When the device is to be used as a drill, the means of rocking the shaft 10 may be disconnected and the shaft locked in its rocked position by any suitable means, not shown, the loop of spring 16 is removed from finger 17, and the valve 13 allowed to drop.

Having thus described the invention, what is claimed as new is:

In a seed planter, spaced angle irons on the planter, a planter shoe and its shank adjustably mounted on the angle irons, set screws to secure the shoe and its shank to the angle irons when adjusted, and a block interposed between the end of each set screw and the angle iron.

In testimony that I claim the foregoing as my own, I have hereto affixed my signature in the presence of two witnesses.

PETER E. WISTRAND.

Witnesses:
O. D. SMITH,
O. M. PETERSON.

Copies of this patent may be obtained for five cents each, by addressing the "Commissioner of Patents, Washington, D. C."